United States Patent
Luger et al.

(10) Patent No.: US 11,876,416 B2
(45) Date of Patent: Jan. 16, 2024

(54) ROTARY MACHINE HAVING A POSITION SENSOR

(71) Applicant: Robert Bosch GmbH, Stuttgart (DE)

(72) Inventors: Dieter Luger, Karlstadt (DE); Gerhard Bund, Lohr-Rodenbach (DE)

(73) Assignee: Robert Bosch GmbH, Stuttgart (DE)

( * ) Notice: Subject to any disclaimer, the term of this patent is extended or adjusted under 35 U.S.C. 154(b) by 273 days.

(21) Appl. No.: 17/384,229

(22) Filed: Jul. 23, 2021

(65) Prior Publication Data
US 2022/0052593 A1 Feb. 17, 2022

(30) Foreign Application Priority Data

Aug. 17, 2020 (DE) .................... 10 2020 210 407.7

(51) Int. Cl.
*H02K 29/08* (2006.01)
*G01D 5/14* (2006.01)
*H02K 11/215* (2016.01)

(52) U.S. Cl.
CPC ............. *H02K 29/08* (2013.01); *G01D 5/145* (2013.01); *H02K 11/215* (2016.01)

(58) Field of Classification Search
CPC ....... H02K 29/08; H02K 11/215; G01D 5/145
See application file for complete search history.

(56) References Cited

U.S. PATENT DOCUMENTS

| 10,243,432 | B2 * | 3/2019 | Hieda | ................ | H02K 11/0141 |
| 2001/0037794 | A1 * | 11/2001 | Wayama | ................ | G01D 5/145 |
| | | | | | 73/114.37 |
| 2009/0078489 | A1 * | 3/2009 | Feier | ........................ | H02K 7/06 |
| | | | | | 180/339 |
| 2014/0312746 | A1 * | 10/2014 | Taniguchi | .............. | H02K 29/06 |
| | | | | | 310/68 B |

FOREIGN PATENT DOCUMENTS

DE 102017130342 A1 * 6/2019 ............. H02K 11/33

OTHER PUBLICATIONS

Machine translation of DE 102017130342 A1 (Year: 2019).*

* cited by examiner

*Primary Examiner* — Bernard Rojas
(74) *Attorney, Agent, or Firm* — Maginot, Moore & Beck LLP

(57) ABSTRACT

A rotary machine, in particular electric motor, includes a position sensing means for sensing a rotational position of a pole wheel that is rotatable about an axis of rotation. The pole wheel has a circumferential edge, and the position sensing means has at least one first position sensor for sensing a change in a magnetic field, at least one magnetic element arranged on the pole wheel, and at least one circuit card on which electronic components are arranged. The first position sensor is arranged at least indirectly on the circuit card. The first position sensor extends at least partially into a space of the pole wheel that surrounded by the circumferential edge.

16 Claims, 4 Drawing Sheets

ROTARY MACHINE HAVING A POSITION SENSOR

This application claims priority under 35 U.S.C. § 119 to application no. DE 10 2020 210 407.7, filed on Aug. 17, 2020 in Germany, the disclosure of which is incorporated herein by reference in its entirety.

BACKGROUND

The present disclosure relates to a rotary machine and in particular to an electric motor. Such machines have been known from the prior art for a long time. It is also known from the prior art to sense a rotational position of such rotary machines, in particular during operation. In addition, it is also known that such machines, such as electric motors, are also controlled by open-loop and/or closed-loop control in dependence on this rotational position. Electric motor encoders that can sense the rotational position are used for this purpose. Position measuring systems are known, some of which use optical, magnetic or coil technology to sense the respective rotational position.

Optical systems are sometimes mechanically relatively sensitive and require small mechanical tolerances when being installed (especially due to thermal expansion). In addition, optical systems are relatively expensive to manufacture and complex to produce and require special know-how. In addition, optical sensors are in some cases sensitive to soiling. Frequently, in the case of coils, multiturns, multiple revolutions or digital interfaces are not possible. Magnetic sensors sometimes react very sensitively to influences, such as magnetic fields from materials that influence the magnetic field, and generally to external influences.

Nevertheless, magnetic systems have advantages such as, for instance, cheaper manufacture.

SUMMARY

The present disclosure is therefore based on the object of improving such a magnetic position sensor for applications. This is achieved by the provisions described in detail below. Advantageous embodiments and further developments are also described herein.

A rotary machine according to the disclosure, in particular an electric motor, has a position sensing means for sensing a rotational position of a pole wheel that is rotatable about an axis of rotation, this pole wheel having a circumferential edge, and this position sensing means having at least one first position sensor for sensing a change in a magnetic field, and at least one magnetic element being arranged on the pole wheel (this magnetic element and the position sensor preferably acting in combination for the purpose of sensing the rotational position). Furthermore, the position sensing means has at least one circuit card on which electronic components are arranged, and the first position sensor is also arranged at least indirectly on this circuit card.

Preferably, the first position sensor extends at least partially into a space of the pole wheel that is surrounded by the circumferential edge. Preferably, the magnetic element is arranged within the circumferential edge. In the case of a preferred embodiment, the magnetic element also realizes a circumferential edge, at least in sections and preferably completely.

An at least indirect arrangement of the position sensor on the circuit card is understood to mean that this position sensor may be arranged directly on this circuit card, but that it may also be arranged on a further carrier, which in turn is arranged on the circuit card and in this case projects, in particular, in the direction of the pole wheel.

The space of the pole wheel surrounded by the circumferential edge is understood to be, in particular, a region that extends into the interior, or an interior space, of the pole wheel with respect to a plane formed by the circumferential edge, or the end face of the circumferential edge, i.e. that the position sensor extends into the interior of the pole wheel, or into this interior space. A rotary machine is understood to be a machine that, in particular, outputs rotary motions.

In the case of a preferred embodiment, the pole wheel has a permanent magnet as a magnetic element. Thus, for example, there may be a permanent magnet that has a magnetic north and a magnetic south pole. However, a plurality of permanent magnets may also be arranged and, in particular, alternately arranged, thereby enabling the accuracy of the rotational position sensing to be changed.

In the case of a particularly preferred embodiment, the device has an evaluation means for evaluating at least one sensing result of the first position sensor. Preferably in this case, the evaluation means has a control unit to evaluate at least one sensing result of the first position sensor.

In the case of another preferred embodiment, the rotary machine has a rotor and/or a stator. Particularly preferably, the rotor is mechanically connected to a motor shaft. Particularly preferably, the pole wheel is also arranged—in particular in a rotationally fixed manner—on this motor shaft. Particularly preferably, the pole wheel is held as close as possible to the printed circuit board mentioned above.

The printed circuit board, or circuit card, serves in particular to control the rotational position sensing, and in particular to evaluate the rotational position sensing. The design described here ensures that the magnetic field generated by the pole wheel, or its magnets, is arranged as close as possible to the sensor means, i.e. to the position sensor or sensors, or rotates relative to these sensor means, or position sensors.

In the case of a preferred embodiment, realized in the printed circuit board there is a recess in which the circumferential edge of the pole wheel runs. In this way, the pole wheel can be brought very close to the printed circuit board, and in particular to the position sensors. However, as mentioned above, it would also be possible for a further carrier to be arranged on the printed circuit board, which in particular also projects into the pole wheel, or which is designed in such a way that at least a portion of the position sensor, and in particular the position sensor, projects into the pole wheel. Preferably, the above-mentioned circumferential edge of the magnetic element of the pole wheel also runs within this recess.

In the case of the design described here, however, a recess is formed in the printed circuit board, this being effected, particularly preferably, by milling and in particular by depth milling. In this way, it is possible to realize a central island, on which the position sensor or sensors and/or magnetic field sensors are placed, on the printed circuit board. The pole wheel is formed in a milled circle segment around this sensor island, or the island on which the position sensor or position sensors is/are arranged. Thus, the circuit board is specially designed for receiving and evaluating a pole wheel angle. Preferably, this island has a circular cross-section, as viewed along the axis of rotation of the pole wheel.

Preferably, in this way the position sensor or sensors is/are thus arranged inside the pole wheel, and in particular inside a recess, or opening, realized by the pole wheel.

In the case of a preferred embodiment, the recess arranged in the printed circuit board is a milled-out recess made in the printed circuit board. Particularly preferably, the recess is an annular recess. It is particularly preferred to make an annular recess, since the circumferential edge of the pole wheel is also annular and can run in this recess. In addition, such an annular recess is particularly easy to produce by milling.

Particularly preferably, the position sensor extends, or the position sensors extend, into the pole wheel in the direction of the axis of rotation of the pole wheel by a predefined length, and this length is at least 1.0 mm. Preferably this length is at least 1.2 mm, preferably 1.4 mm, preferably 1.6 mm, preferably 1.8 mm and preferably 2.0 mm. By extending in this way, the distance between the permanent magnet of the pole wheel and the position sensors can be reduced, and thus also the accuracy of the position measurement can be improved. Preferably, this length is less than 8 mm, preferably less than 6 mm, preferably less than 4 mm and particularly preferably less than 3 mm. These maximum lengths have proven to be sufficient to effect adequate sensing of the magnetic field generated by the (permanent) magnets of the pole wheel.

In the case of another advantageous embodiment, the position sensing means has a multiplicity of position sensors. These position sensors in this case may preferably all be arranged within the pole wheel. Particularly preferably, at least 4, preferably at least 6, preferably at least 8, preferably at least 10, preferably at least 12, preferably at least 14 position sensors are provided. In this case these may be arranged, particularly preferably, along a circle line, and particularly preferably equidistantly (in particular along this circle line).

In the case of another preferred embodiment, the circuit card has a thickness that is greater than 1.5 mm, preferably greater than 2.0 mm, preferably greater than 2.5 mm, preferably greater than 3.0 mm. In the case of another design, the circuit card has a thickness that is less than 5.0 mm, preferably less than 4.0 mm, preferably less than 3.5 mm.

In the case of another preferred embodiment, the recess in the thickness direction (i.e. a radial direction with respect to the axis of rotation) of the printed circuit board has a thickness that is greater than 1.0 mm, preferably greater than 1.5 mm, preferably greater than 2.0 mm.

In the case of another preferred embodiment, the recess in the thickness direction of the printed circuit board has a depth that is less than 3.0 mm, preferably less than 2.0 mm, preferably less than 2.8 mm, preferably less than 2.5 mm.

Preferably, the printed circuit board is arranged relative to circumferential edge of the pole wheel in such a manner that a distance between the printed circuit board, or the groove base of the recess and the circumferential edge, is greater than 0.2 mm, preferably greater than 0.4 mm, preferably greater than 0.6 mm. Particularly preferably, the pole wheel is arranged relative to the printed circuit board in such a manner that a distance between the circumferential edge and the groove base of the recess is less than 3.0 mm, preferably less than 2.0 mm, preferably less than 1.8 mm, preferably less than 1.6 mm, preferably less than 1.4 mm.

In the case of one embodiment, the depth milling in the printed circuit board is 2.2 mm deep, such that the pole wheel can be placed over the position sensors and card. This positioning of the pole wheel over the position sensors minimizes disturbances that act externally upon the magnetic field of the pole wheel and makes the effect, or evaluation of the position measurement, less susceptible to disturbances. In the case of another preferred embodiment, the circuit card is multilayered. Particularly preferably, the circuit card has at least 2, preferably at least 3 and preferably at least 4 layers. Thus, the printed circuit board may preferably be made of a material such as FR4 material. FR4 denotes a class of printed circuit board base material. This is an epoxy resin glass composite material.

Particularly preferably, the printed circuit board has six layers. Particularly preferably, the recess is realized in such a manner that two of these layers are still available in a region of the recess and/or depth milling. This allows the signals of the position sensors to be connected to other components of the printed circuit board (for example between these layers) in this region. In the case of a further preferred embodiment, the position sensing means has a further position sensor, which is arranged on a surface of the printed circuit board that faces away from the pole wheel, i.e. on a rear side of the circuit card (as viewed from the pole wheel).

Preferably, a multiturning function can be achieved by means of this further position sensor means. In particular, full revolutions can also be sensed by means of this position sensor.

Particularly preferably, this further position sensor means is suitable and intended to sense the position even in an inoperative state, i.e. in a state in which the pole wheel is not being driven.

Particularly preferably, the device has an energy storage means, such as a capacitor or a battery, which supplies this further position sensor means with electrical energy, and in particular also when the rotary machine is in a switched-off state. In particular in this case, this further position sensing means may preferably be arranged in a region of the circuit card that is opposite the region where the above-mentioned position sensors are arranged.

This further position sensing means is therefore particularly preferably also arranged within a geometric cylinder realized by the circumferential edge of the pole wheel (although preferably outside the pole wheel). This further position sensor means in this case may be arranged in such a manner that the (geometric) axis of rotation of the pole wheel runs through it.

The present disclosure is further directed towards a method for operating a rotary machine, in particular an electric motor. In this case, a position sensing means senses a rotational position of a pole wheel that is rotatable about an axis of rotation, this pole wheel having a circumferential edge, and this position sensing means having at least one first position sensor that senses a change in a magnetic field, and at least one magnetic element being arranged on the pole wheel.

The position sensing means in this case preferably has at least one circuit card on which, in particular, electronic components are arranged, and the first position sensor is also arranged at least indirectly on this circuit card.

According to the disclosure, the first position sensor extends at least partially into a space of the pole wheel surrounded by the circumferential edge.

Advantageously, the pole wheel rotates relative to the printed circuit board. Particularly preferably, the circumferential edge of the pole wheel rotates within a groove and/or milled out recess arranged within the printed circuit board.

Particularly preferably, the position sensing means is realized in the manner described above.

BRIEF DESCRIPTION OF THE DRAWINGS

Further advantages and embodiments are evident from the appended drawings.

There are Shown Therein.

DETAILED DESCRIPTION

Figure 1:
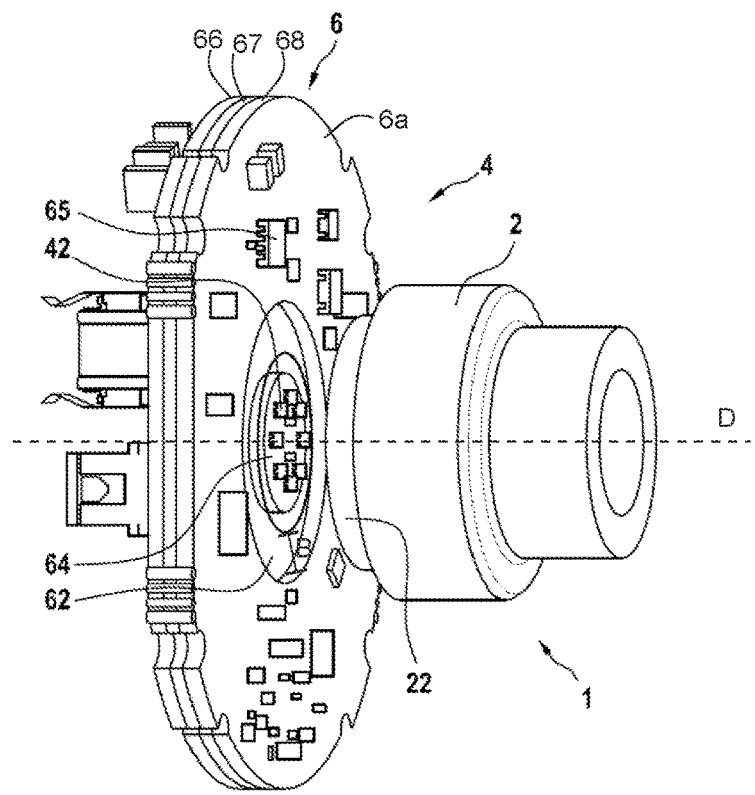
FIG. 1 a perspective view of a pole wheel and a printed circuit board.

FIG. 1 shows a circuit card 6, which here has a plurality of layers 66, 67 and 68. This circuit board in this case has a first surface 6a, which here faces to the right, and in particular in the direction of a pole wheel 2. In addition, the circuit card has a rear surface on which elements such as a control means (not shown) may also be arranged.

The pole wheel 2 rotates with respect to an axis of rotation D and has in its interior (not shown) at least one magnetic element, and in particular a permanent magnet. The reference 22 denotes a circumferential edge of the pole wheel.

Realized in the circuit card 6 there is a circumferential recess 62, and in particular a milled recess. The reference 64 denotes an island-like region (not milled-out) that is completely surrounded by the recess 62. Arranged on this island-like region 64 there is a multiplicity of position sensors 42. In this case, these are evenly distributed here in a circumferential direction.

The reference B denotes a radial width of this recess. The circumferential edge 22 engages in this recess 62.

Figure 2:
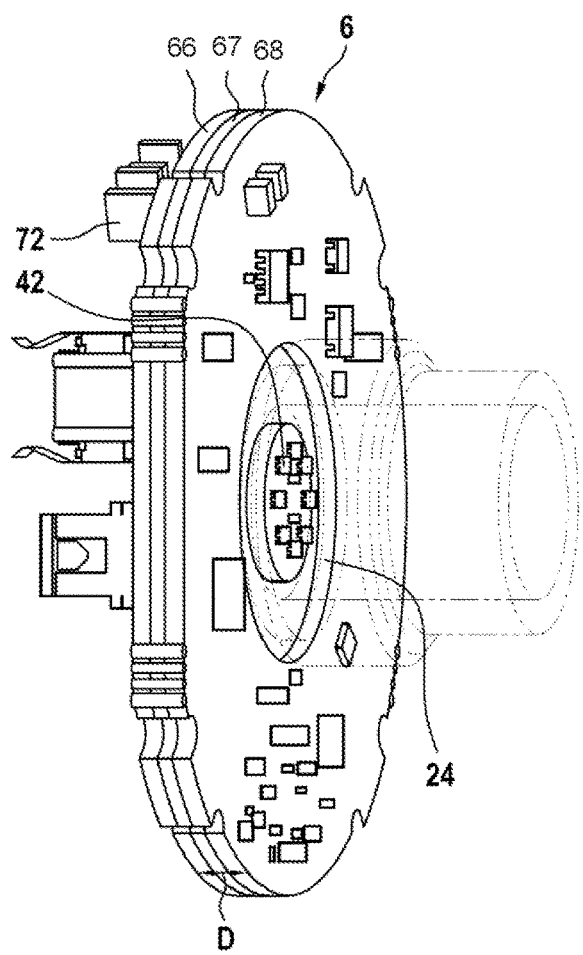
FIG. 2 another perspective view, in which the circumferential edge of the pole wheel projects into a recess.

FIG. 2 shows a representation in which the pole wheel runs in the recess 62, and in which, in particular, the circumferential edge 22 runs in this recess.

The reference 24 denotes an interior space of the pole wheel, in which, in particular, the permanent magnets are also arranged. It can be seen that the position sensors 42 project into this space and are thus arranged close to the permanent magnets of the pole wheel.

The reference T denotes the thickness of the printed circuit board, and the reference 72 denotes a heat sink. Preferably, the width B of the recess is configured in such a manner that the circumferential edge is also spaced, in the plane of the printed circuit board, at least 0.2 mm, preferably at least 0.3 mm, preferably at least 0.4 mm and preferably at least 0.5 mm from the circumferential edge of the recess. There is also a corresponding spacing in relation to the island on which the position sensors are arranged.

Figure 3:
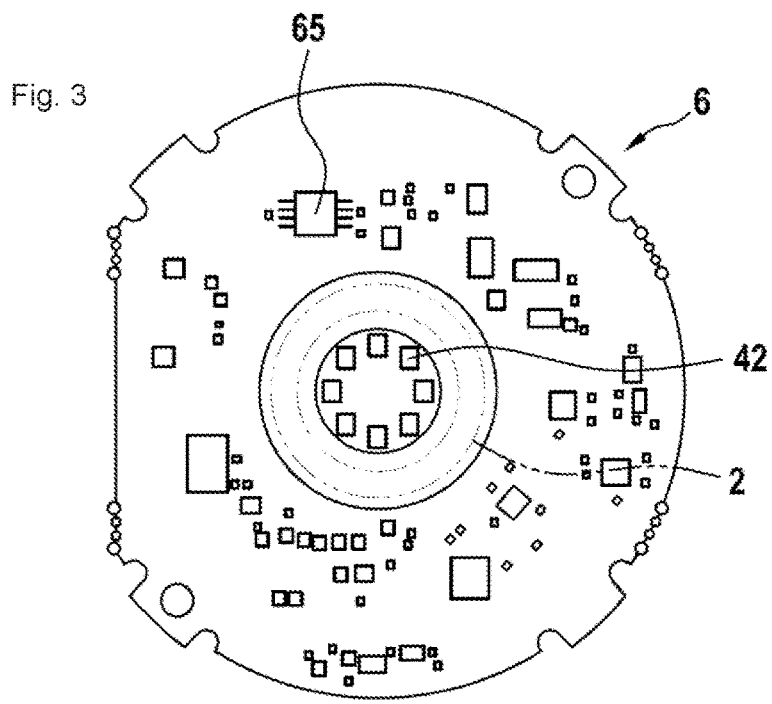
FIG. 3 a plan view, from above, of the circuit card with the pole wheel arranged thereon.

FIG. 3 shows a plan view of the printed circuit board and the pole wheel 2. Here again, the position sensors can be seen, which are arranged in the circumferential direction of the axis of rotation D. The reference 65 denotes an electronic component that is arranged on the printed circuit board, specifically on the region of the printed circuit board that has not been machined or milled-out.

Figure 4:
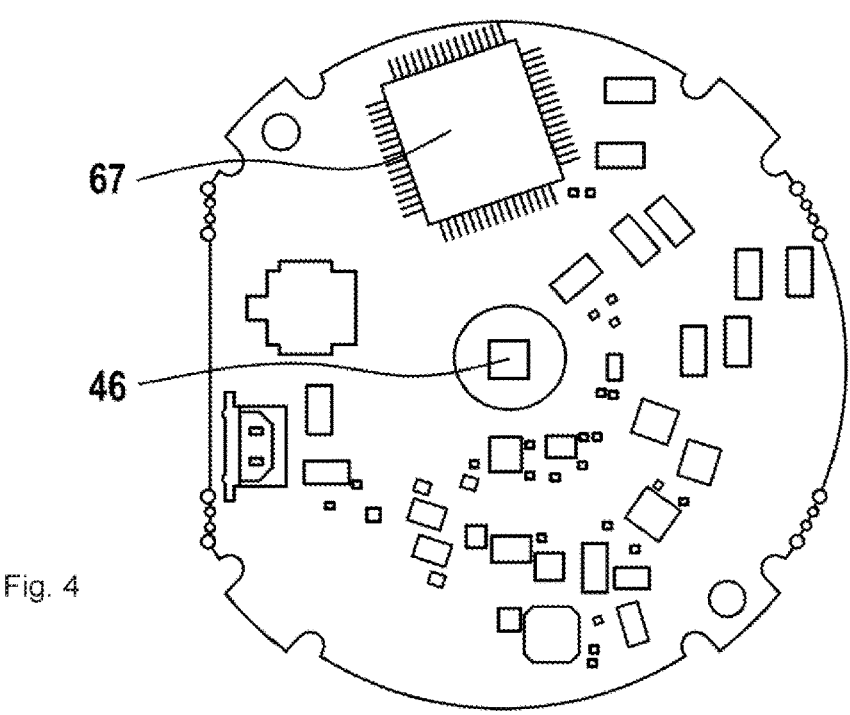
FIG. 4 a plan view of the rear side of the circuit card shown in FIG. 3.

FIG. 4 shows a plan view of the printed circuit board from below. Another position sensor means can be seen here, which is also suitable for sensing magnetic fields, but in this case while the device is at a standstill and/or in a de-energized operating state. For this purpose, a battery (not shown) is provided, which enables operation of this position sensor 46 even when the pole wheel (not shown) is at a standstill.

Here also in this case, the position sensor means 46 is arranged within the region that lies within a cross-section of the pole wheel. The reference 67 denotes a central processor means that serves to evaluate the data of the individual position sensors.

Figure 5:
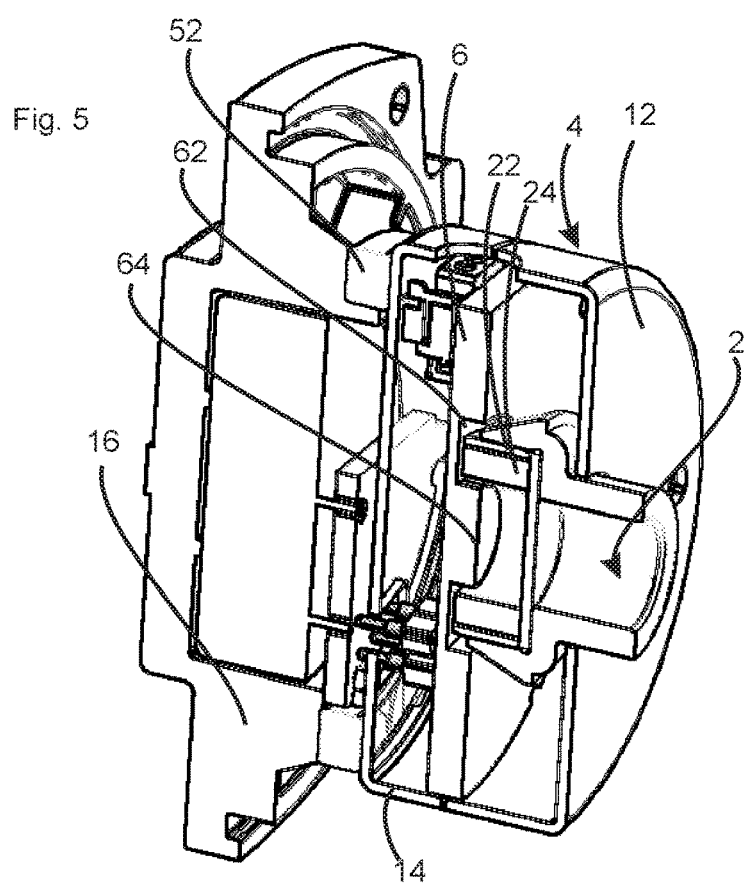
FIG. 5 a further representation of the pole wheel arranged on the printed circuit board.

FIG. 5 shows a further representation to illustrate the disclosure. Here again the pole wheel is shown, and here also a magnetic element 24, such as a permanent magnet, provided within the pole wheel, can be seen. Also shown is the island-like region that is arranged within the pole wheel and can thus be brought close to the magnetic element. The circumferential edge and a circumferential edge of the magnetic element 24 are located within the recess 62. It can be seen that an end face, or circumferential edge, of the magnetic element 24 also projects into the recess.

The reference 12 denotes a first housing part, and the reference 14 denotes a second housing part. The reference 16 denotes an encoder cover, and the reference 52 denotes a seal. The reference 15 denotes an energy storage means such as a battery, which serves to supply the above-mentioned further position sensor.

Figure 6:
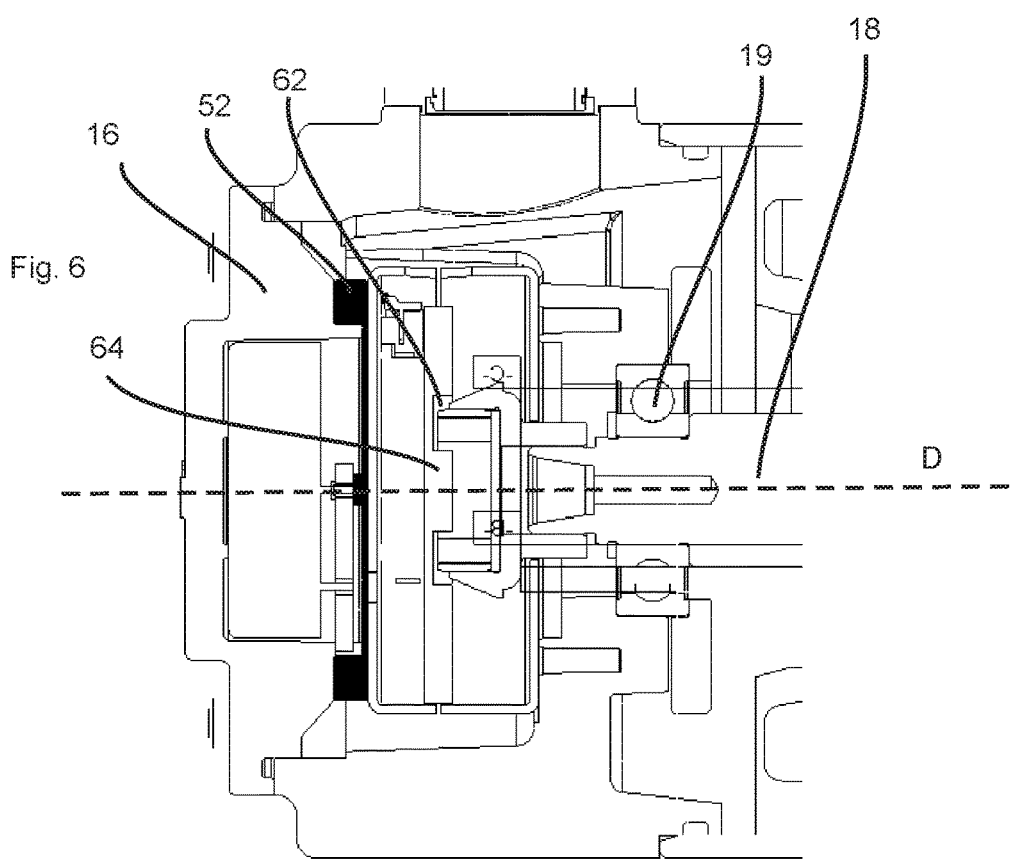
FIG. 6 a sectional view of the representation shown in FIG. 5.

FIG. 6 shows a sectional view of a device according to the disclosure. Also shown here is a shaft 18 on which the pole wheel 2 is arranged. This shaft 18 is rotatably mounted with respect to a housing by means of a bearing 19. The reference D denotes the axis of rotation with respect to which the pole wheel 2 is rotatably mounted. The above-mentioned position sensors project into the pole wheel in the direction of this axis of rotation.

Figure 7:
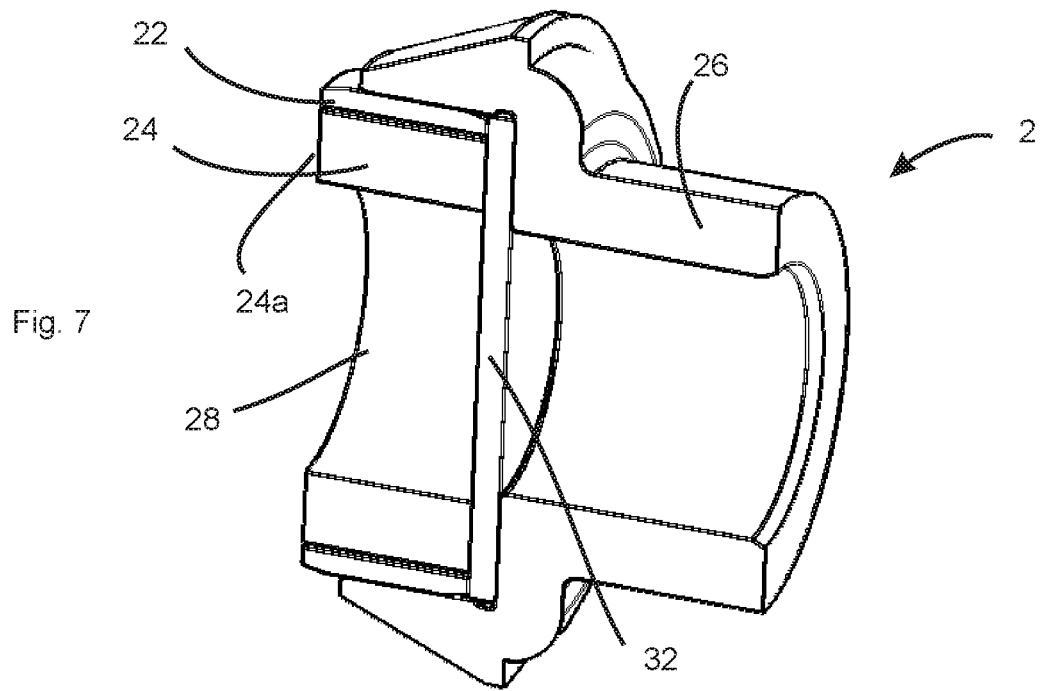
FIG. 7 a representation of the pole wheel.

FIG. 7 shows a representation of the pole wheel 2. The magnetic element 24 is also shown again here. This magnetic element realizes a circumferential edge 24a, which also projects into the recess 62. The reference 26 denotes a carrier, or hub, of the pole wheel. On the one hand, this carrier may be attached to the (motor) shaft, and on the other hand this carrier also serves to accommodate the magnetic element 24. The reference 28 denotes the space inside the pole wheel into which the position sensors project. The reference 32 denotes a base shield against which the magnetic element rests and/or is arranged. This base shield 32 is realized here in the form of a plate.

Figure 8:
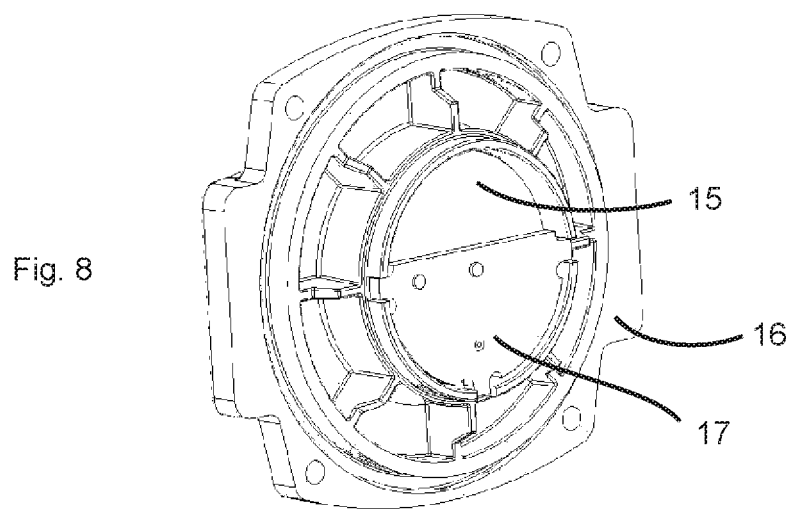
FIG. 8 a representation of the encoder cover.

FIG. 8 shows a representation of the encoder cover 16, which here also accommodates a battery 15. The reference 17 denotes another printed circuit board.

The applicant reserves the right to claim all features disclosed in the application documents insofar as they are novel compared to the prior art, either individually or in combination. It is also noted that the individual figures also describe features that may be advantageous in themselves. Persons skilled in the art will immediately recognize that a particular feature described in a figure may also be advantageous without the adoption of further features from this figure. Furthermore, persons skilled in the art will recognize advantages may also result from a combination of a plurality of features shown in individual figures or in different figures.

The invention claimed is:

1. A rotary machine comprising:
a pole wheel rotatable about an axis of rotation, the pole wheel having a circumferential edge;

a position sensing device configured to sense a rotational position of the pole wheel, the position sensing device comprising:
- at least one first position sensor configured to sense a change in a magnetic field;
- at least one magnetic element arranged on the pole wheel; and
- at least one circuit card on which electronic components are arranged, the first position sensor being arranged at least indirectly on the circuit card, wherein the first position sensor extends at least partially into a space of the pole wheel that is surrounded by the circumferential edge, and wherein the at least one circuit card defines a recess in which the circumferential edge of the pole wheel runs.

2. The rotary machine according to claim 1, wherein the recess is a milled-out recess defined in the at least one circuit card.

3. The rotary machine according to claim 1, wherein the recess is an annular recess.

4. The rotary machine according to claim 1, wherein the first position sensor extends into the pole wheel in a direction of the axis of rotation by a predefined length, and the predefined length is at least 1.0 mm.

5. The rotary machine according to claim 1, wherein the position sensing device includes at least one additional position sensor.

6. The rotary machine according to claim 1, wherein the at least one circuit card has a thickness that is greater than 1.5 mm and less than 5 mm.

7. The rotary machine according to claim 6, wherein the thickness of the at least one circuit card is greater than 2.0 mm and less than 4 mm.

8. The rotary machine according to claim 7, wherein the thickness of the at least one circuit card is greater than 2.5 mm and less than 3.5 mm.

9. The rotary machine according to claim 8, wherein the thickness of the at least one circuit card is greater than 3.0 mm.

10. The rotary machine according to claim 1, wherein the recess has a depth in a thickness direction of the at least one circuit card that is greater than 1 mm and less than 3 mm.

11. The rotary machine according to claim 10, wherein the depth is greater than 2.0 mm and less than 2.8 mm.

12. The rotary machine according to claim 11, wherein the depth is less than 2.5 mm.

13. The rotary machine according to claim 1, wherein the at least one circuit card is of a multilayer structure.

14. The rotary machine according to claim 1, wherein the position sensing device further comprises a second position sensor arranged on a surface of the at least one circuit card that faces away from the pole wheel.

15. The rotary machine according to claim 1, wherein the rotary machine is an electric motor.

16. A method for operating a rotary machine comprising:
sensing, with a position sensing device, a rotational position of a pole wheel that is rotatable about an axis of rotation, the pole wheel having a circumferential edge, and the position sensing device including at least one first position sensor that senses a change in a magnetic field, at least one magnetic element arranged on the pole wheel, and at least one circuit card on which electronic components are arranged, the first position sensor arranged at least indirectly on the at least one circuit card and extending at least partially into a space of the pole wheel that is surrounded by the circumferential edge, wherein the at least one circuit card defines a recess in which the circumferential edge of the pole wheel runs.

* * * * *